United States Patent [19]

Moore

[11] Patent Number: 5,762,135

[45] Date of Patent: Jun. 9, 1998

[54] UNDERGROUND WELL ELECTRICAL CABLE TRANSITION, SEAL AND METHOD

[76] Inventor: Boyd B. Moore, 427 Mignon, Houston, Tex. 77024

[21] Appl. No.: 633,244

[22] Filed: Apr. 16, 1996

[51] Int. Cl.$^6$ .......................... H02G 15/04; E21B 33/02
[52] U.S. Cl. ........................ 166/65.1; 166/379; 174/76
[58] Field of Search ........................ 166/65.1, 378, 166/379; 439/604, 936; 174/47, 74 A, 74 R, 76, 77 R, 93

[56] References Cited

U.S. PATENT DOCUMENTS

| | | | |
|---|---|---|---|
| 3,437,149 | 4/1969 | Cugini et al. | 166/379 |
| 3,739,073 | 6/1973 | Schneider et al. | 174/23 R |
| 3,764,728 | 10/1973 | Howie et al. | 174/76 |
| 3,781,456 | 12/1973 | Knowles et al. | 174/23 R |
| 4,090,565 | 5/1978 | McGee | 166/379 |
| 4,154,302 | 5/1979 | Cugini | 166/378 |
| 4,583,804 | 4/1986 | Thompson | 439/588 |
| 4,627,489 | 12/1986 | Reed | 166/65.1 |
| 4,627,490 | 12/1986 | Moore | 166/65.1 |
| 4,708,201 | 11/1987 | Reed | 166/65.1 |
| 5,289,882 | 3/1994 | Moore | 166/379 |
| 5,377,747 | 1/1995 | Didier | 166/65.1 |

FOREIGN PATENT DOCUMENTS

| | | | |
|---|---|---|---|
| 2506604 | 8/1975 | Germany | 174/77 R |
| 1270100 | 4/1972 | United Kingdom | 174/76 |
| 2 215 921 | 9/1989 | United Kingdom . | |
| 2231735 | 11/1990 | United Kingdom | 174/77 R |

OTHER PUBLICATIONS

Mark W. Earley, et al., The National Electrical Code® Handbook, Fifth Edition, pp. 663–704, 1990.

*Primary Examiner*—David J. Bagnell

[57] ABSTRACT

The present invention relates to a transition for electrical well cable through the wellhead barrier of an underground well leading to an electrical power cable connected to an above-ground electrical power source, where the only connection between the electrical well cable and the electrical power cable is formed outside the wellhead barrier within an area adjacent to the wellhead barrier classified as a hazardous location, the connection being listed and approved for hazardous locations by a nationally recognized testing laboratory, and a method of forming the transition. A confined seal is located in the well around the electrical well cable for blocking the flow of fluid both into and out of the well.

23 Claims, 12 Drawing Sheets

UNDERGROUND WELL ELECTRICAL CABLE TRANSITION, SEAL AND METHOD

BACKGROUND OF THE INVENTION

1. Field of the Invention

The present invention relates to an electrical cable transition, seal and method for an underground well and, more particularly, to a simplified, low cost transition, seal and method for such a cable with a seal that blocks fluid flow to and from the well and eliminates any cable splices in the well, and meets the requirements for electrical codes and OSHA regulations.

2. Description of the Related Art

In underground wells such as oil wells, electrical power is furnished to submersible pumps and other downhole equipment through insulated electrical conductors that extend through conduit in the well casing. In order to connect the downhole equipment to a power source outside the well, these conductors must penetrate a wellhead barrier that is sealed to a top opening of the casing. The configuration of cables and seals in the wellhead is called a "penetrator," the purpose for which is to provide a transition zone where the cable penetrates the wellhead barrier, and gas and other fluids are prevented from leaking both into and out of the well.

Because the downhole equipment must be connected to an above-ground power source, a splice or other connection must be formed between cable connected to the power source and cable extending from the downhole equipment. This splice has been formed below the wellhead barrier in the past, which isolates the splice from the area around the outside of the wellhead barrier which is classified as a hazardous location.

Such hazardous locations are referred to as being "classified" because they are defined or classified by industry standards such those promulgated by the American Petroleum Institute. The equipment and facilities for such classified locations must be in compliance with the Occupational Safety and Health Act ("OSHA") Section 1910, Subpart S, for locations where hazardous concentrations of gases or vapors are present because of leakage.

A penetrator which has gained acceptance in the oil industry is shown and described in U.S. Pat. No. 5,289,882, which has the same inventor as the inventions described below. This penetrator solved the problem of providing a sealed arrangement for supplying electrical power to a sealed wellhead over a petroleum producing well bore in an area classified as hazardous, where explosions or fires may occur due to gases and other substances associated with the production of petroleum products being ignited by electric arcs. The penetrator in U.S. Pat. No. 5,289,882, included a rigid conduit with a splice fitting formed below the wellhead barrier, for connecting the downhole electrical conductors of a wellbore power cable with electrical conductors extending from a power source on the surface. A rigid conduit was provided for containing the conductors in the well, as they extended from the splice fitting to a rigid conduit outside the wellhead barrier which had a breather vent to inhibit the passage of fluids from the downhole electrical conductor to the power source electrical conductor. An arrangement was also provided for securing the power source electrical conductor adjacent a wellhead to supply power to the downhole electrical conductor by extending into the sealed barrier associated with the wellhead and inhibiting explosions and fires in a hazardous area.

Improvements over the penetrator in U.S. Pat. No. 5,289,882, are described in PCT application WO 94/25726, and related, pending U.S. patent applications, which is a continuation-in-part of U.S. Pat. No. 5,289,882.

While these types of penetrators have proven to be safe and effective, they require a relatively large number of parts and, since the splice between the electrical conductors for the downhole equipment and the power source is located below the wellhead barrier, they require a substantial amount of time to complete.

Therefore, there exists a need for providing a lower-cost penetrator that is easy to assemble, which reduces the installation time and the cost of the presently-existing penetrator, but which does not compromise the safety of the well.

SUMMARY OF THE INVENTION

The problems discussed above are solved by the invention described below which is directed to a transition for electrical well cable through the wellhead barrier of an underground well leading to an electrical power cable connected to an above-ground electrical power source, a confined seal for the transition, and a method for forming the transition.

The transition includes a length of electrical well cable extending uninterrupted from an underground well through the wellhead barrier, a connection between the underground well cable and the electrical power cable, the connection being formed outside the wellhead barrier within an area adjacent to the wellhead barrier classified as a hazardous location. The connection is listed and approved for hazardous locations by a nationally recognized testing laboratory such as, for example, Factory Mutual Research Corporation. A confined seal is located in the well around the electrical well cable for blocking the flow of fluid into or out of the well.

The invention applies to electrical well cable which has an outer protective cable coating and a plurality of insulated electrical conductors projecting from the protective cable coating. A typical electrical well cable includes three electrical conductors, but the invention can be applied to other types of electrical well cable in various shapes, sizes and configurations.

The transition includes a primary conduit with an inner surface defining an elongated opening, the primary conduit extending through at least a portion of the wellhead barrier and surrounding a portion of the electrical conductors and a portion of the protective cable coating. An elastomeric seal is provided in the primary conduit for sealing the space between the electrical conductors and the inner surface of the conduit. The elastomeric seal has opposed faces, and a relatively hard backing material is located in the primary conduit abutting against both faces of the elastomeric seal. The relatively hard backing material is located around and between the conductors in the inner surface of the conduit. The backing material can also surround at least a part of the protective cable coating that extends into the elongated opening of the primary conduit.

The transition also includes an elongated rigid conduit extending between the primary conduit and an opening in the wellhead barrier for each of the conductors. A fluid-tight connection is formed between one end of the elongated conduits and the primary conduit and also between the other end of the elongated conduits and the wellhead barrier openings.

One of the fluid-tight connections includes a manifold cap connected to the primary conduit, with openings in the manifold cap for receiving the elongated rigid conduits. A back-up bushing is positioned between the relatively hard backing material and the manifold cap. The backing material preferably formed of an epoxy putty with good dielectric properties that is resistant to well fluids and which is compressed before it hardens to surround the conductors and fill the spaces in the elongated opening in the primary conduit. The elastomeric seal is preferably formed of synthetic rubber.

A method for forming the confined elastomeric seal begins with exposing at least one insulated electrical conductor by removing the outer protective coating from a portion of electrical well cable that extends uninterrupted from downhole electrical equipment. A relatively hard backing material, such as the epoxy putty mentioned above, is positioned around the insulated conductor cable and abutting opposing faces of the elastomeric seal. The backing material extends along the insulated electrical conductor on both sides of the seal.

The seal and relatively hard backing material are surrounded along the length of the insulated electrical conductor with a primary conduit for isolating the insulated electrical conductor from the well and forming a seal around the conductor. The seal is then confined between the portions of hardened backing material to prevent well fluids from flowing both into and out of the well between the insulated electrical conductor and the primary conduit.

The elastomeric seal is preferably formed with an outer diameter larger than the opening of the primary conduit, and with openings for receiving the insulated electrical conductors, are smaller than the outer diameter of the conductors for providing a tight seal between adjacent surfaces. The seal is confined by compressing the epoxy putty before it hardens to fill all the spaces in the primary conduit and around the elastomeric seal, insulated electrical conductor and electrical well cable. A compressing tool connected between the primary conduit and the electrical well cable can be used to compress the epoxy putty and extrude it before it hardens into all of the spaces in the primary conduit.

BRIEF DESCRIPTION OF THE DRAWINGS

A better understanding of the present invention can be obtained when the following detailed description of exemplary embodiments is considered in conjunction with the following drawings, in which.

DETAILED DESCRIPTION OF EXEMPLARY EMBODIMENTS

The subject invention relates to a penetrator for electrical conductor cable which transmits electrical power from an above-ground remote electrical power source (not shown) to downhole electrical equipment such as submersible pumps. Penetrators which have previously been sold, such as the one shown and described in U.S. Pat. No. 5,289,882 and PCT application WO 94/25726, involve the formation of a splice in or below the wellhead barrier, between the conductor cable connected to the downhole equipment and the conductor cable connected to the remote power source.

The invention described in detail below is directed to a different type of transition or penetrator for electrical conductor cable which eliminates the splice between the cable connected to the downhole equipment and the power source conductor cable. In other words, any break or interruption in the electrical cable from the downhole equipment is eliminated as it extends through in the well. The invention also includes a unique, self-energized, confined seal in the well around the cable, which effectively blocks fluid from flowing either into or out of the well, and a method of forming such a seal and transition. By providing for this type of transition, cost is significantly lowered by reducing the number of parts required and the installation time, without compromising well safety.

Figure 1:
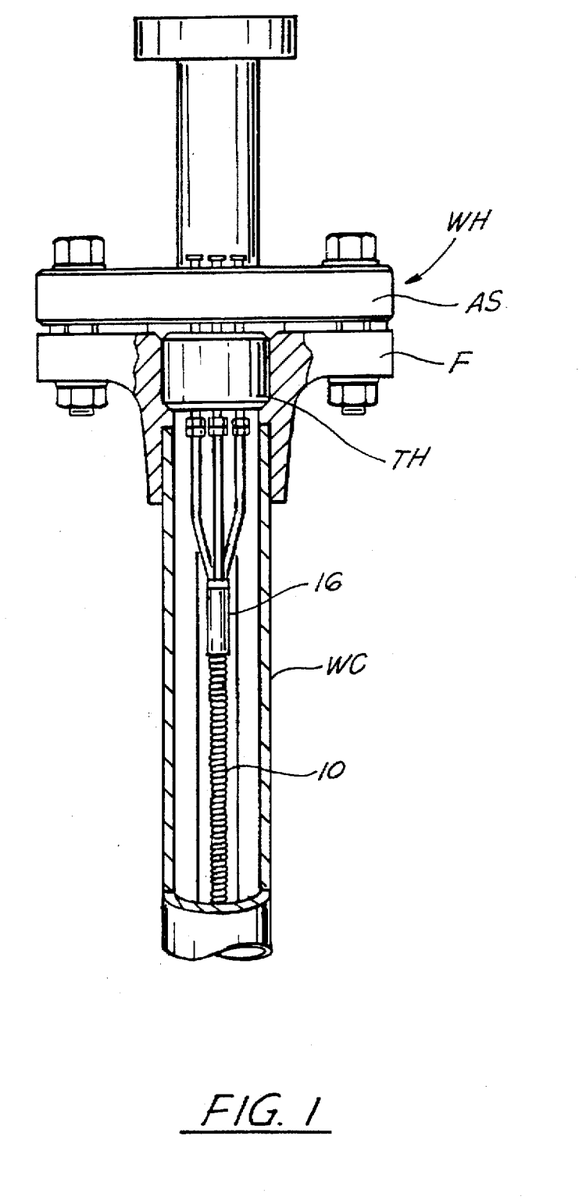
FIG. 1 is a front elevational view, partially in section, of the wellhead barrier of an underground well with an electrical penetrator utilizing the present invention.
Figure 2:
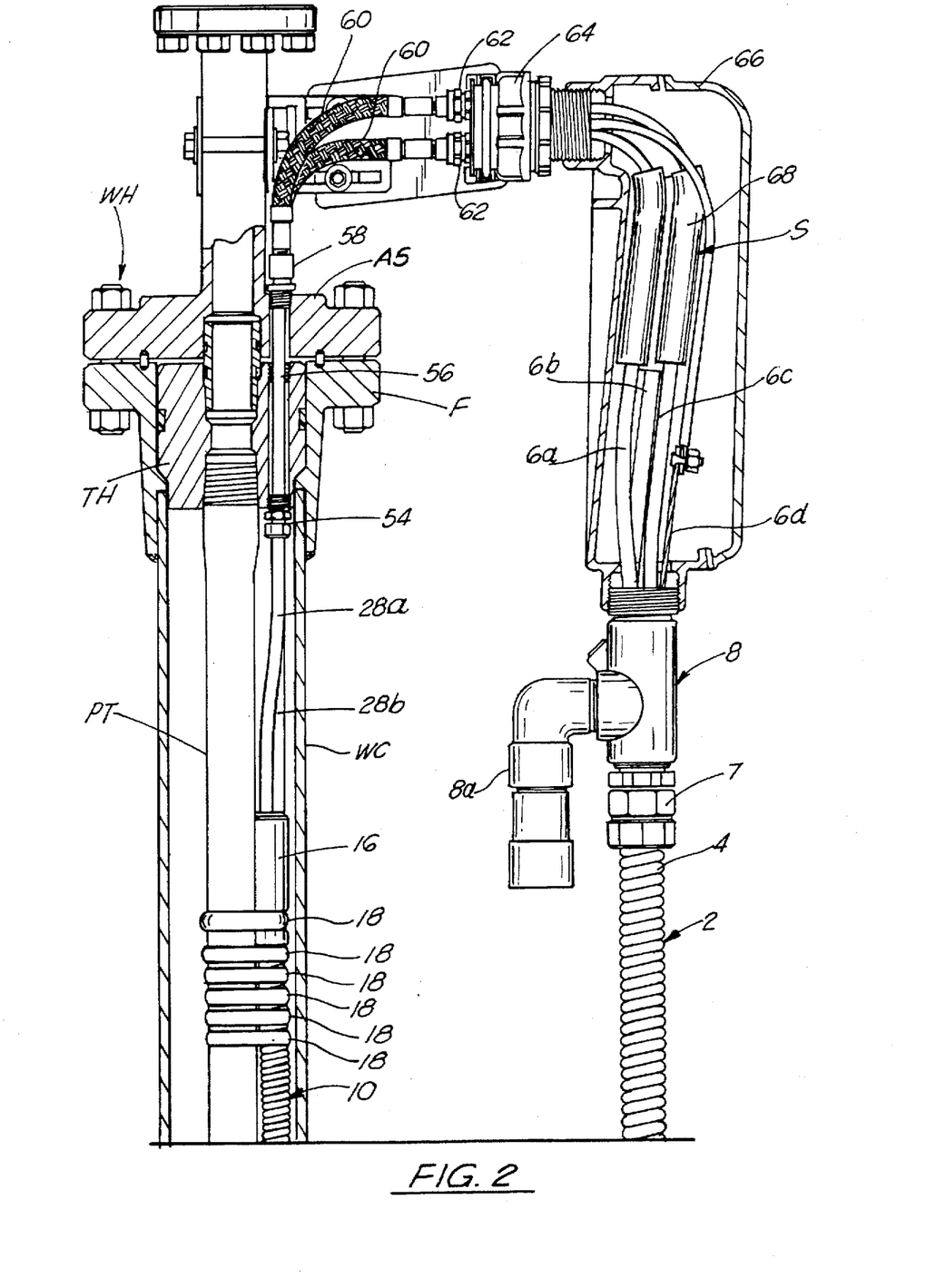
FIG. 2 is a side elevational view, partially in section, of the wellhead barrier and electrical penetrator system of FIG. 1, which in addition shows a splice fitting outside the wellhead barrier.

FIGS. 1 and 2 are front and side views, respectively, of a wellhead barrier WH of an underground well, which includes the transition formed in accordance with the invention. In the described embodiment, a remote power source furnishes conventional three-phase power through conductor cable with three conductors. However, other types and sizes of conductor cable can be used in accordance with the invention.

As best shown in FIG. 2, power from the remote power source is transmitted to the well through an electrical conductor cable 2, which is connected to the remote power source (not shown). The conductor cable 2 has an outer protective coating 4 known as an armored cladding, which is typically covered by an impervious polymer sheath, that is well known in the industry. The conductor cable 2 also includes three insulated conductors 6a, 6b and 6c, that carry the three-phase power, and one uninsulated ground conductor 6d.

The remote power source is located in a safe zone, which is a zone outside a hazardous location adjacent to the well which might contain gases and other fluids originating from the well. The term "hazardous location" as used herein is that area around a wellhead barrier that is classified as hazardous under industry standards as described above.

The conductors 6a, 6b and 6c extend through an electrical cable seal termination 7, which connects to a conduit seal fitting 8 which is used as a Tee for a breather drain or vent 8a. The Tee 8 is in turn connected to a conduit outlet body or housing 66 which houses an electrical splice generally designated by reference letter S, all of which are located outside the wellhead barrier WH.

The splice S is described in greater detail below and is used to connect the conductor cable 2 to a conductor cable 10 that is connected to and extends from downhole electrical equipment (not shown). The splice S is also described in detail in U.S. Pat. No. 5,289,882, and PCT application WO 94/25726, and has been approved by Factory Mutual Research Corporation, which is a nationally recognized testing laboratory, for locations classified as hazardous. However, unlike the invention in U.S. Pat. No. 5,289,992 and PCT application WO 94/25726, the splice S, which is located outside the wellhead barrier WH, is the only connection between the conductor cable 2 from the power source and the conductor cable 10.

In order to provide an effective electrical transition from the wellhead barrier WH to the external power source, without a splice or other electrical connection in or below the wellhead barrier WH, an effective seal must be used in order to prevent gases and other fluids from being transmitted from the well through the wellhead barrier WH to the outside, through or around the electrical conductor cable 10 from downhole equipment. For example, when a downhole pump (not shown) is turned off, pressure inside the well casing can typically range between 50–3,000 psi. This exerts a high pressure along the electrical conductor cable 10 which, if an effective seal is not provided, could cause gas and other liquids to leak out of the wellhead barrier WH. Also, when the downhole pump is turned on or the casing is vented, pressure inside the casing rapidly decreases. This causes gases and other fluids entrained in and around seals, cable insulation and the cable jacket to expand, which could cause the seals to fail and blow out of the primary conduit 16. The transition described below includes a confined seal which effectively blocks the flow of fluid in both directions under the conditions described. The seal, which is described in greater detail below, is part of the penetration system of the invention.

Figures 3, 4:
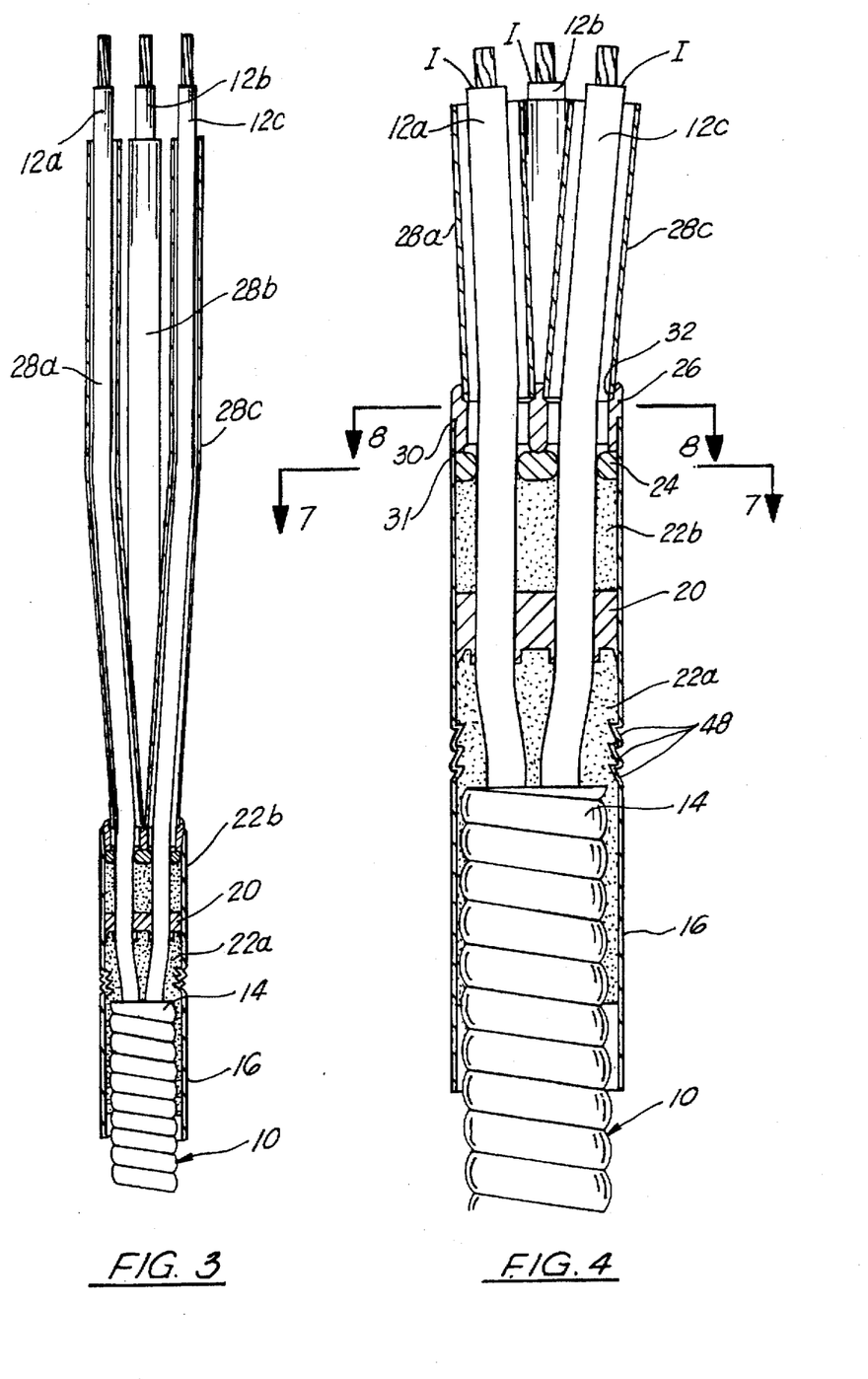
FIGS. 3 and 4 are partial sectional views of the penetrator of FIGS. 1 and 2, showing in particular details of the seal for blocking the flow of fluid from around insulated electrical conductors.

As shown in FIGS. 3 and 4, the conductor cable 10 contains three insulated conductors 12a, 12b and 12c. Like the conductor cable 2, the conductor cable 10 is armored, which means it has an outer protective coating 14. The spaces between the conductors 12a, 12b and 12c and the protective coating 14 are filled with a dielectric cable insulation (not shown) that is well known and encapsulates the conductors.

The conductor cable 10 extends into a rigid primary conduit 16, in which the confined two-way seal is formed. As best shown in FIG. 2, the conductor cable 10 and the primary conduit 16 are secured to a length of production tubing PT through a plurality of cable bands 18. As shown, five cable bands 18 can be used to hold the conductor cable 10 to the production tubing PT, while another, upper cable band secures the primary rigid conduit 16 to the production tubing PT.

Figure 9:
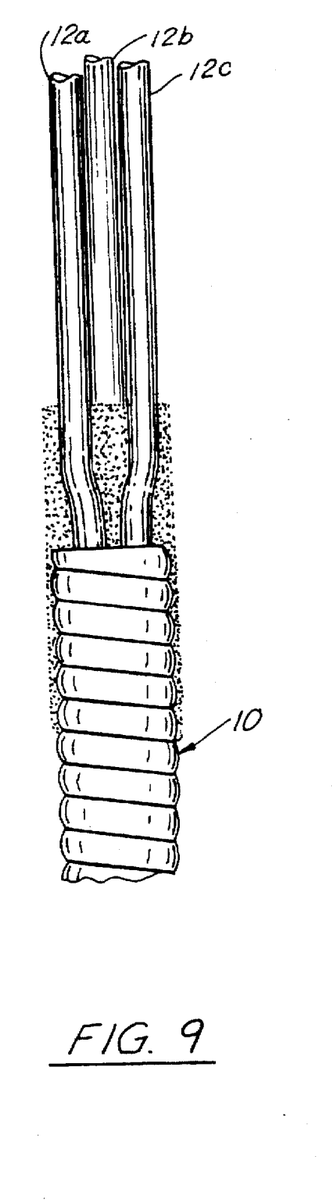
FIGS. 9–13 are front elevational views, partially in section, that illustrate a method of forming the transition seal shown in FIGS. 3 and 4.

The seal in the primary conduit 16 is formed, as shown in FIG. 9, by first trimming the armor cladding 14 and internal cable insulation (not shown) that encapsulates the insulated conductors, to expose the insulated conductors 12a, 12b and 12c, so they can extend through the wellhead barrier WH and into the area outside of the wellhead WH classified as a hazardous location. As shown in FIG. 4, the insulation I is maintained on each of the conductors.

As shown in FIG. 9, an epoxy putty, designated generally by reference numeral 22a, is packed around the conductors 12a, 12b and 12c, and also around the trimmed-off end of the armored coating 14, so that the epoxy putty 22a extends a short distance along the outer surface of the coating 14.

The epoxy putty is preferably a hand-kneadable, two-part epoxy that hardens in a relatively short period of time after it is mixed and packed around the conductors 12a, 12b and 12c (for example, from 3–30 minutes). The putty must have a very low shrinkage upon hardening and also be resistant to well fluids. It must also have good dielectric qualities and be stable at temperatures up to at least 200° F. There are commercially-available putties of this type on the market from manufacturers such as Polymeric Systems, Inc., Phoenixville Pa. and Glenmarc Manufacturing, Inc., Spring Grove, Ill.

Figures 10, 11:
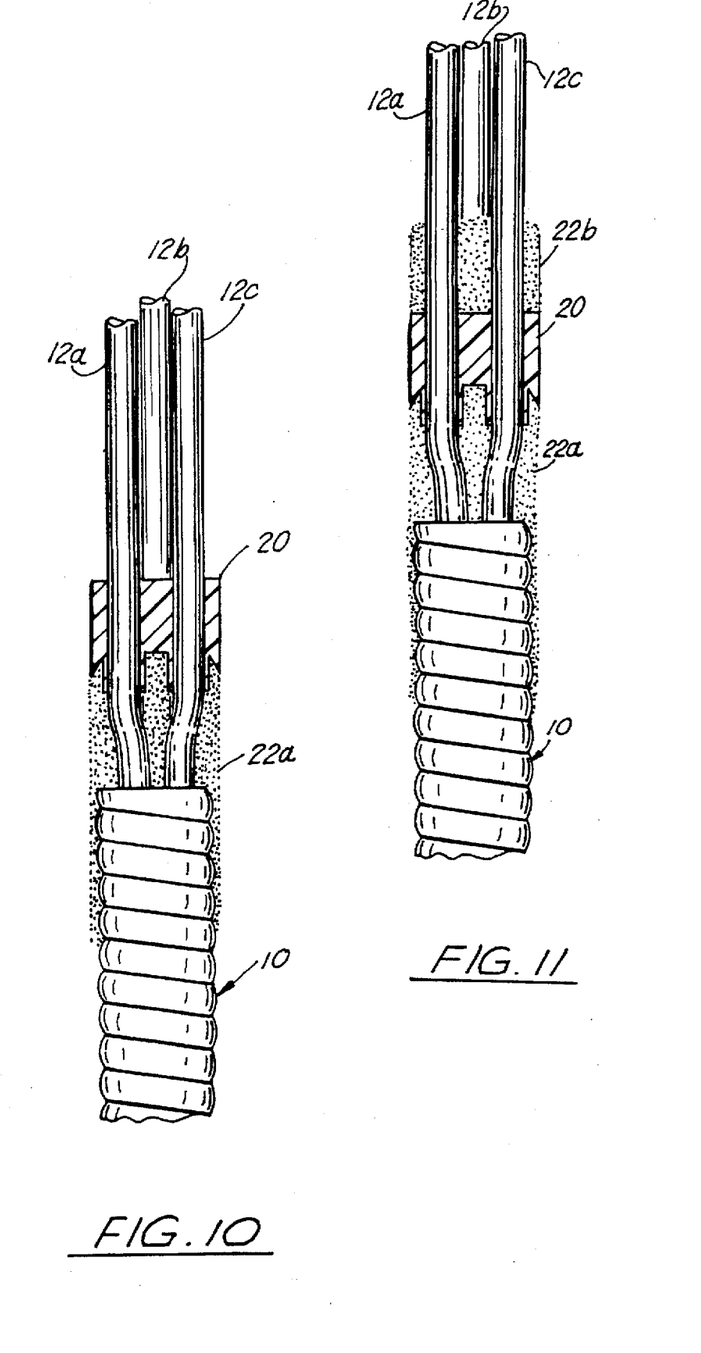

Referring to FIG. 10, an elastomeric seal 20 (shown in detail in FIG. 6) with openings 20a, 20b and 20c, is positioned on the conductors 12a, 12b and 12c, above the epoxy putty 22a that was packed as described above. The seal is preferably formed of a synthetic rubber, but can be formed of any elastomeric material with dielectric properties, that is resilient and resistant to well fluids. The seal 20 has an outer diameter that is slightly larger than the inside diameter of the primary conduit 16 to form an interference fit and an initial seal.

After the seal 20 is positioned as shown in FIG. 10, a second amount of epoxy putty 22b is packed above the seal 20 and around the conductors 12a, 12b and 12c as shown in FIG. 11.

Figure 12:
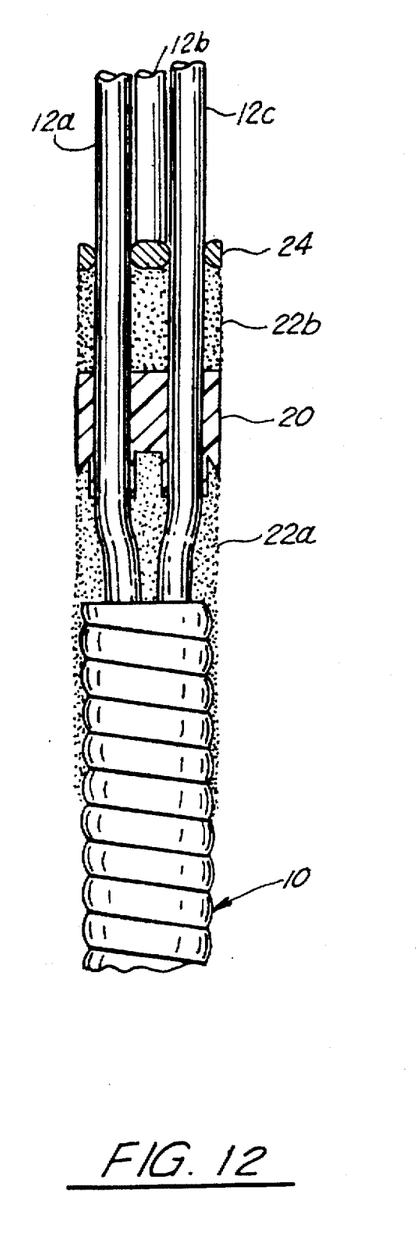
Figure 13:
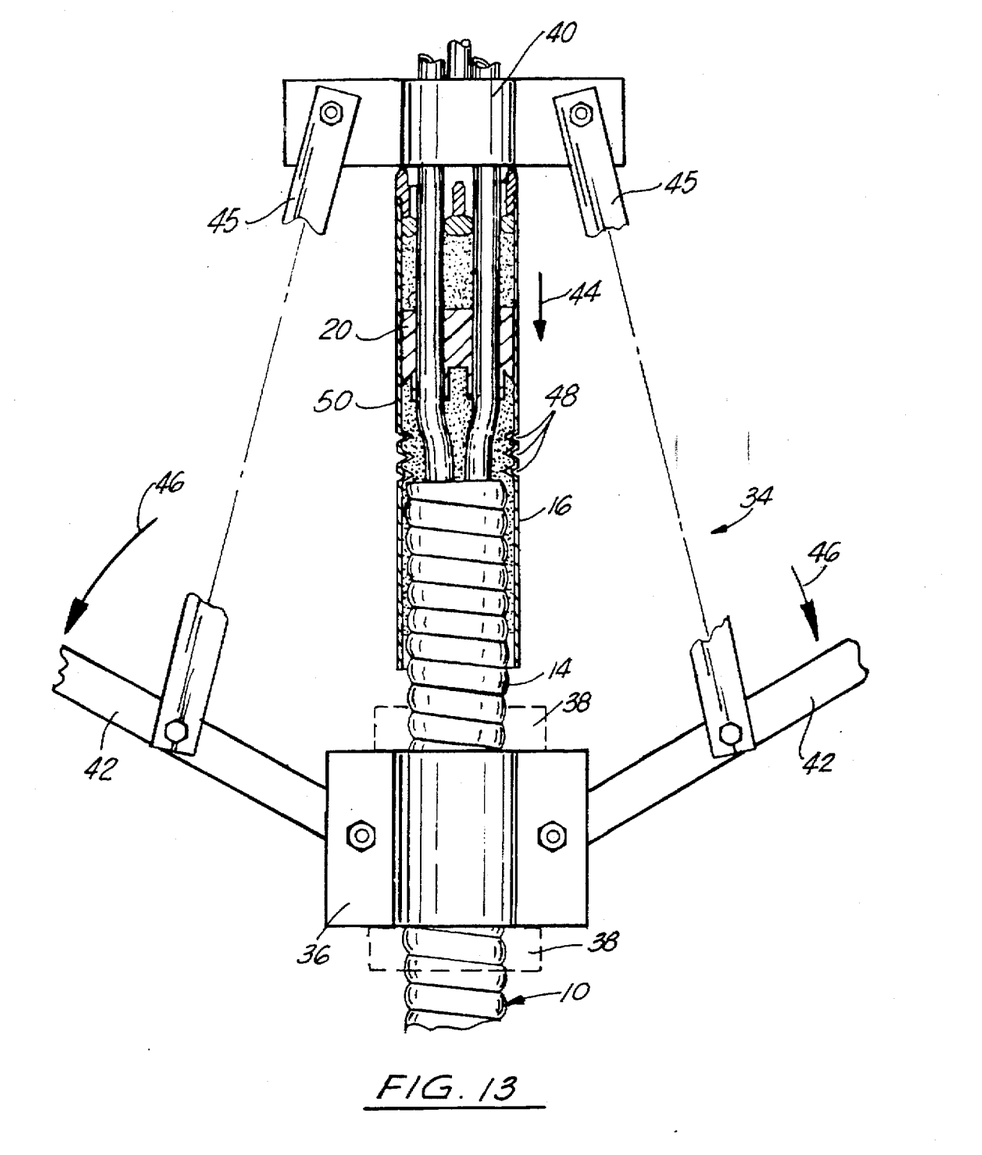

As shown in FIG. 12, after the epoxy putty 22a and 22b is packed as shown in FIG. 11, a back-up bushing 24 is positioned on the conductors 12a, 12b and 12c into engagement with the upper end of the epoxy putty 22b. The back-up bushing 24 is formed of a non-ferromagnetic material such as brass, and is shown best in FIGS. 4 and 12, and sectional view 7. After the elastomeric seal 20 and back-up bushing 24 are positioned as shown and the epoxy putty 22 is packed as shown in FIG. 12, the primary conduit 16 is installed as shown in FIG. 13. During this installation process, the epoxy putty has not yet hardened and is still formable.

Figure 5:
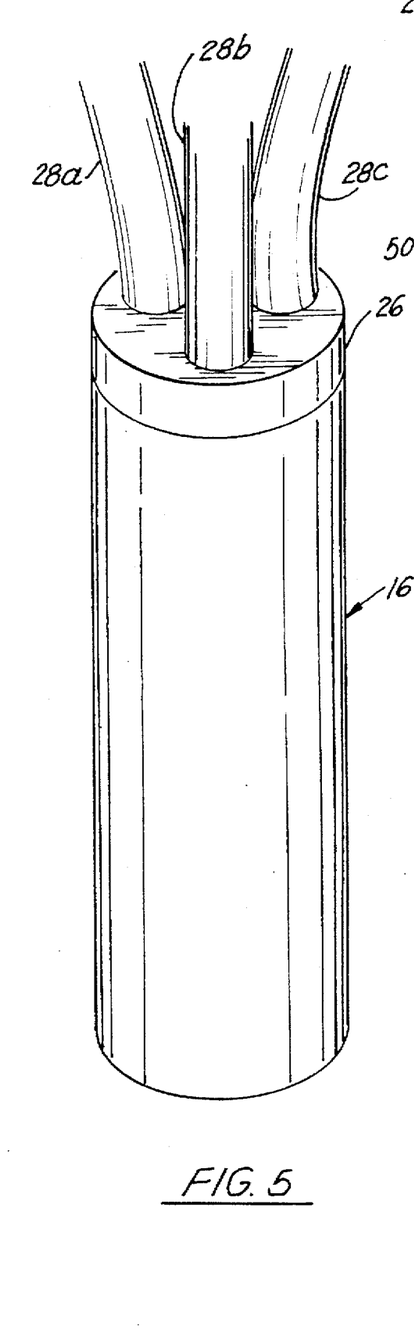
FIG. 5 is a perspective view of the primary rigid conduit that encases the seal in FIGS. 3 and 4, and the elongated conduits that extend from the primary conduit to the wellhead barrier.

As shown best in FIGS. 4 and 5, a manifold cap 26 is mounted on the primary conduit 16, over the conductors 12a, 12b and 12c. Three rigid, elongated conduits 28a, 28b and 28c, one for each of the conductors 12a, 12b and 12c, extend from the primary conduit 16 to openings in a flange F in the wellhead. The primary conduit 16, manifold cap 26 and elongated conduits 28a, 28b and 28c are formed as a single unit of a non-ferromagnetic metal such as stainless steel, with fluid-tight connections between them. These connections are accomplished through soldering or other suitable connections.

As shown best in FIG. 4, the manifold cap 26 has an outer ledge 30 which engages the upper end of the primary conduit 16, and inner ledges 32 for receiving the lower ends of the elongated rigid conduits 28a, 28b and 28c. As also shown in FIG. 4, the conductors 12a, 12b and 12c extend through the rigid conduits 28a, 28b and 28c, the latter serving to isolate the conductors from the well fluids.

Referring to FIG. 13, after the primary conduit 16 is positioned over the conductors 12a, 12b and 12c and the back-up bushing 24, putty sections 22a and 22b, seal 20, and a portion of the cable 10, to where a lower edge 31 of the manifold cap 26 engages the back-up bushing 24, a compression tool generally designated by reference numeral 34 is mounted as shown in FIG. 13. A pair of lower sleeved sections 36 are mounted onto the armored cladding 14 of the conductor cable 10 and clamped in place as shown generally by clamps 38. At this position, a pair of upper sleeves 40, are mounted over the elongated conduits 28a, 28b and 28c. The upper sleeves 40 have an inner opening that is large enough to surround the elongated rigid tubes 28a, 28b and 28c, but small enough to engage the upper surface of the manifold cap 26. A pair of arms 42, pivotally connected to the lower sleeves 36, operate to pull the primary conduit 16 downwardly in the direction of arrow 44 to the position shown in FIG. 13, through a pair of links 45, when the arms 42 are moved in the direction of the arrows 46.

This downward movement of the manifold cap 26 against the back-up bushing 24 compresses the still-formable epoxy putty 22 so that it completely fills the inner passageway of the rigid conduit 16. The primary conduit 16 has a series of saw tooth-shaped grooves 48 located on its inner surface or other means for holding the primary conduit 16 firmly in place when the epoxy putty 22a and 22b hardens and to hold the cable 10 firmly in conduit 16 under pressure.

Figure 6:
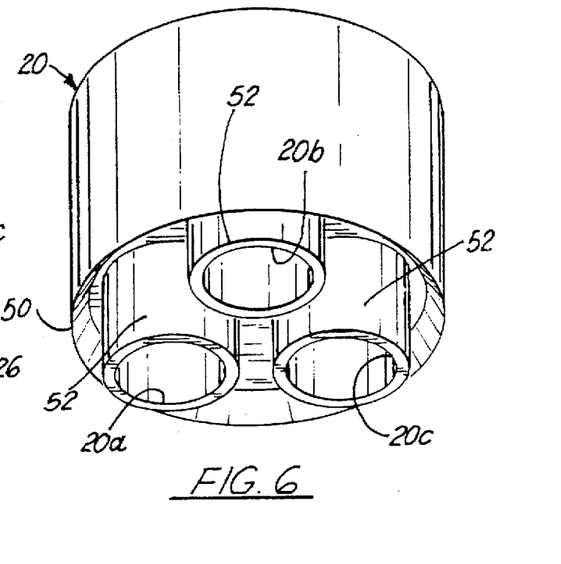
FIG. 6 is a perspective view of an elastomeric seal that seals the insulated electrical conductors in the primary conduit.
Figure 7:
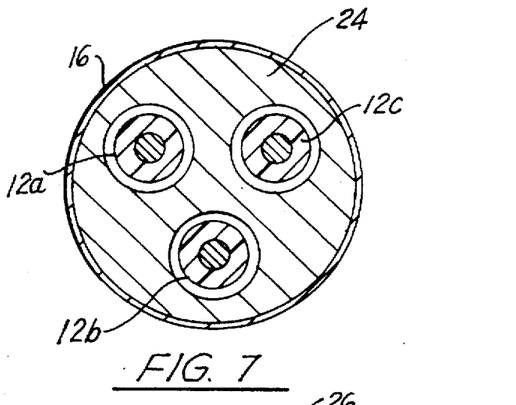
FIG. 7 is a sectional view looking along line 7—7 of FIG. 4.
Figure 8:
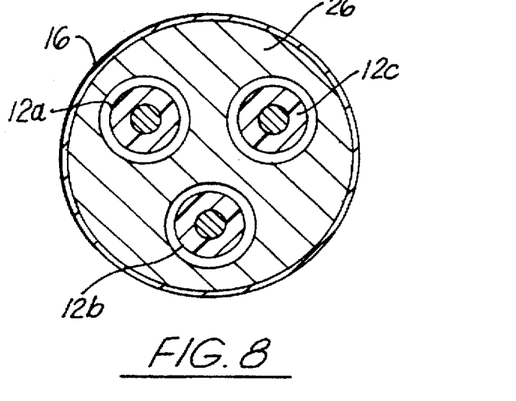
FIG. 8 is a sectional view looking along line 8—8 of FIG. 4.

The seal formed by this arrangement of parts has been found to be effective in blocking the flow of fluids at high well pressures. As shown in FIG. 6, the elastomeric seal 20 can be formed with a beveled lower surface 50 and sleeves 52 which extend along the conductors 12a, 12b and 12c for providing better contact between the elastomeric seal 20 and the inner wall of the primary conduit 16 and with the insulation I on the outer surface of the conductors 12a, 12b and 12c.

The elastomeric seal 20 is self-energized because it is slightly larger in diameter than the elongated opening in the primary conduit 16 and the openings 20a, 20b and 20c are slightly smaller than the insulated conductors 12a, 12b and 12c for providing an interference fit with them. When the primary conduit 16 is installed and the ledge 31 of the manifold cap 26 pushes against the back-up bushing 24, the epoxy putty 22a and 22b is compressed and extruded in and around all the small spaces associated with the conduit 10, the insulation jacket inside the conduit 10, the seal 20, the insulation I on the conductors 12a, 12b and 12c, and the back-up bushing 24. When the epoxy putty 22a and 22b hardens to a relatively hard mass, it confines the seal 20 as well as the conductor insulation I and the internal insulation jacket (not shown) in the cable 10. This confining action, in addition to providing an effective seal when the well is pressured, also prevents gas and other fluids entrained in the elastomeric seal 20 and other resilient materials such as the insulation I from expanding out of the primary conduit 16 and off of the insulated conductors. This condition could occur when pressure is released from the well causing fluid entrained under pressure in the seal 20, insulation I, and the insulation jacket in the well cable 10, to expand and rupture the seal and insulations, causing leakage and electrical short circuits. Thus, the confined seal is self-energized and operates as a two-way seal.

As mentioned above, the rigid, elongated tubes 28a, 28b and 28c serve as conduits for the conductors 12a, 12b and 12c and isolate them from the annulus of the well casing. This is done, as shown in FIG. 2, through the fluid-tight connection between the rigid tubes 28a, 28b and 28c and the manifold cap 26 (FIG. 4), as well as a rigid connection between the tubes 28a, 28b and 28c and the flange F of the wellhead WH. This connection is a conventional ferrule-type fitting, generally designated by reference numeral 54, for connecting the rigid tubes 28 to cooperating rigid tubes 56 that extend through the flange F and adapter spool AS. Another ferrule-type fitting 58, described in detail in PCT application WO 94/25726, connects the tubes 56 to a line number of flexible housings 60 that extend through fittings 62 to a fitting 64 that couples a splice housing 66 to the Tee 8 and cable seal termination 7.

The electrical conductors 6a, 6b and 6c extend through an internal seal (not shown) of the cable seal termination 7 in order to block the flow of gas and other fluids, internal flames and explosions originating within the well from spreading into the armored conductor cable 2. The Tee 8 includes a breather tube 8a for venting gases and other fluids from the well in the event of a failure of the primary seal 20.

The Tee 8 forms a pathway for the conductors 6a, 6b and 6c. The housing 66 protects splices or other connections between the conductors 6a, 6b and 6c which are connected to the external power source, and the conductors 12a, 12b and 12c connected to the downhole equipment.

Because it is possible for the insulation I of the conductors 12a, 12b and 12c to serve as conduits for gas and other fluids originating from the well, the insulated ends of the conductors 12 are inserted into vented rubber seals 68 described in PCT application WO 94/25726, before the uninsulated ends of the conductors 12a, 12b and 12c are electrically connected to the conductor 6a, 6b and 6c. The splice connections S will not be described in detail since they are shown and described in U.S. Pat. No. 5,289,882, and in PCT application WO 94/25726, the descriptions and drawings of which are incorporated by reference herein as though fully set forth. While the invention is described in terms of providing a splice fitting outside the wellhead barrier WH between conductors connected to the downhole equipment and conductors connected to the power source, the invention contemplates other types of connections between these respective conductors outside of the wellhead barrier.

Figure 14:
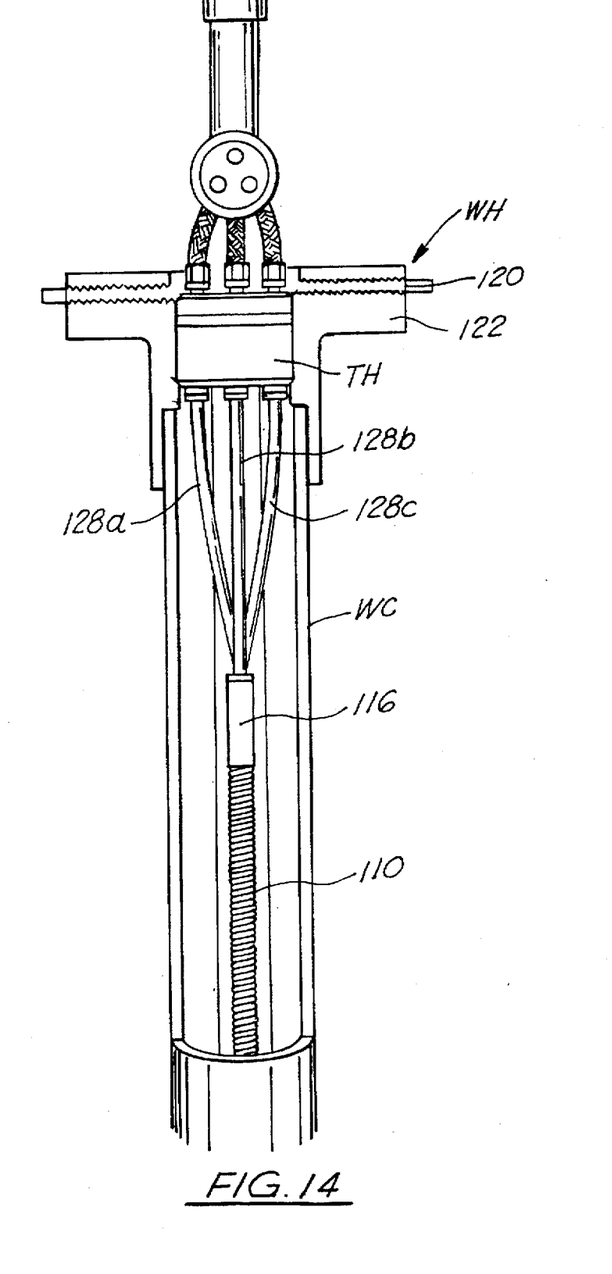
FIG. 14 is a front elevational view, partially in section, which shows the invention used in another type of wellhead barrier.

FIGS. 14–18 illustrate alternative applications for the penetrator described above. In FIG. 14, the same internal seal discussed above for conductor cable 110 is contained in a rigid primary conduit 116. Rigid elongated tubes 128a, 128b and 128c extend from the primary conduit 116 for encasing the conductors in the same manner shown in FIGS. 1–3. 20 However, in this embodiment, the tubing hanger TH forms the wellhead barrier WH for the well that must be penetrated by the conductors (not shown in detail). The tubing hanger TH is supported in the well casing WC and secured in place by bolts 120, which are threaded through well bore casing flange 122 such that they contact the tubing hanger TH. Thus, in this application an upper adapter flange of the type shown in FIGS. 1–3 is not used in forming the wellhead WH.

Figure 15:
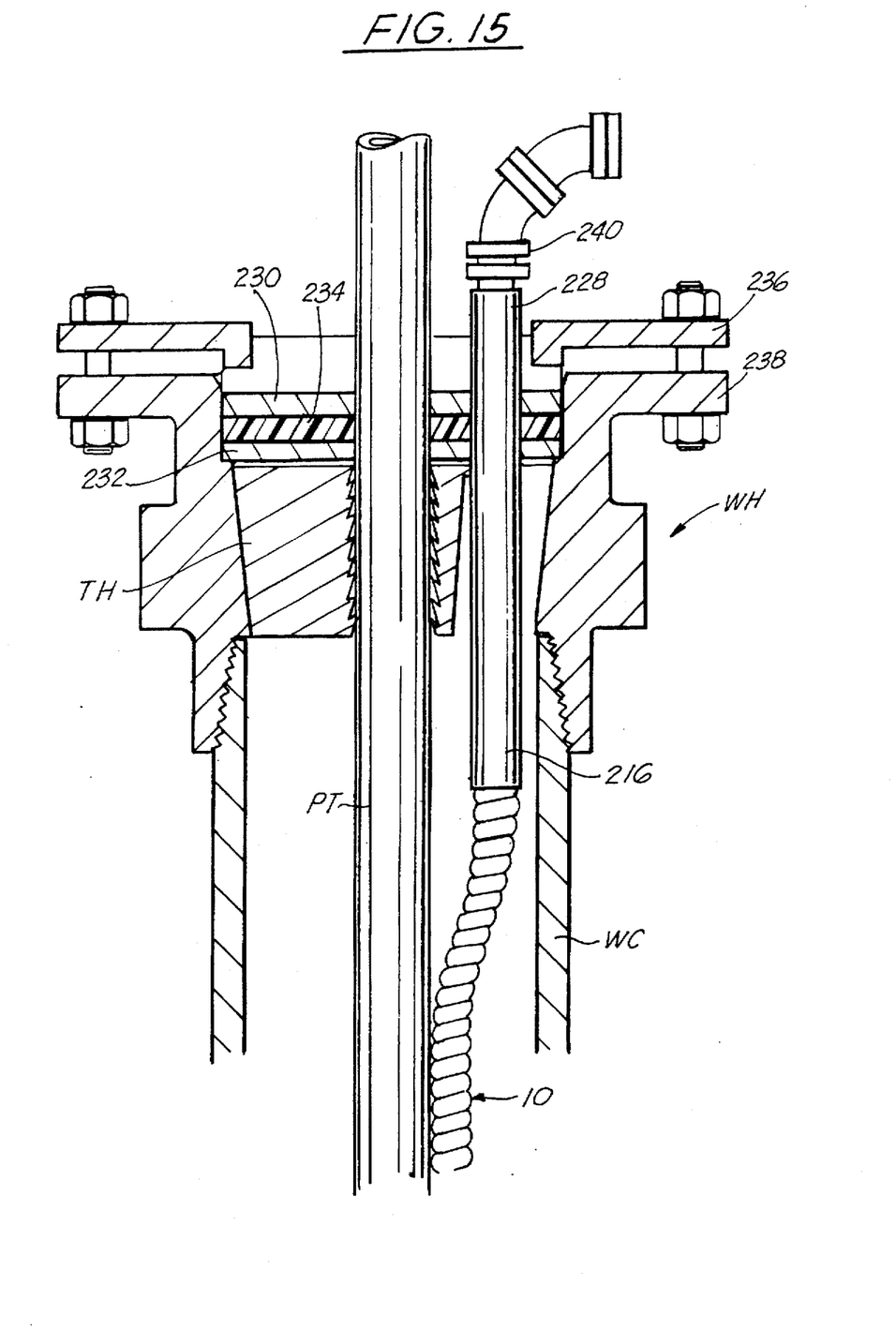
FIG. 15 is a front elevational view, partially in section, which shows the present invention used in a wellhead with a single penetrator tube.
Figure 16:
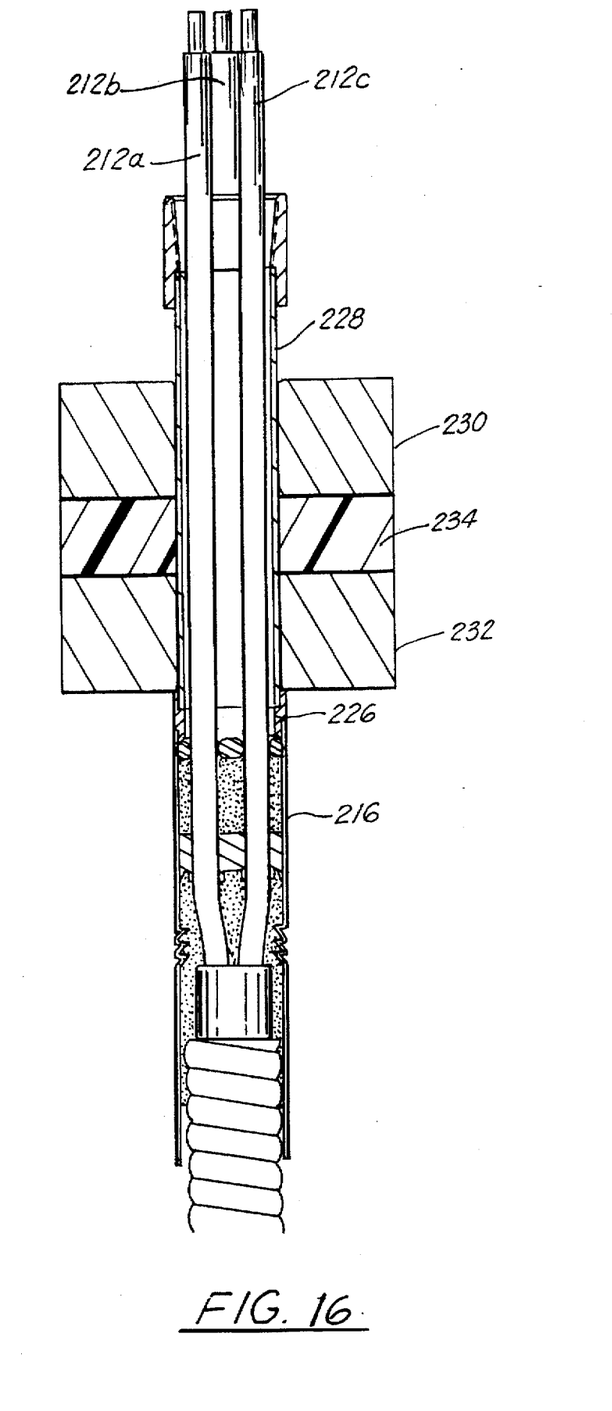
FIG. 16 is a sectional view of the penetrator of FIG. 15.

FIGS. 15–16 illustrate another application for the penetrator described above, which also has an internal confined seal contained in the same type of rigid primary conduit 216. However, this application is different because only a single, elongated conduit or penetrator tube 228 extends through a passageway in the wellhead barrier WH. The wellhead barrier WH includes split upper and lower back up plates 230, 232 for holding a split elastomeric seal 234, for sealing the exterior of the penetrator tube 228 to the wellhead barrier WH. A split holding flange 236 is bolted to a lower wellhead flange 238 for clamping the back up plates 230, 232 and the seal 234. As shown in FIG. 15, the tubing hanger TH is of the slip-type where production tubing PT is held by teeth on the tubing hanger, as is known in the art.

Insulated conductors 212a, 212b and 212c extend through the penetrator tube 228. A manifold cap 226 is secured to the penetrator tube 228 by soldering or other acceptable methods. A conventional fitting 240 is used to connect a portion of the penetrator tube 228 that extends out of the wellhead barrier WH to other conduit that leads to the splice or other connection (not shown) with the electrical conductor cable connected to the power source.

Figure 17:
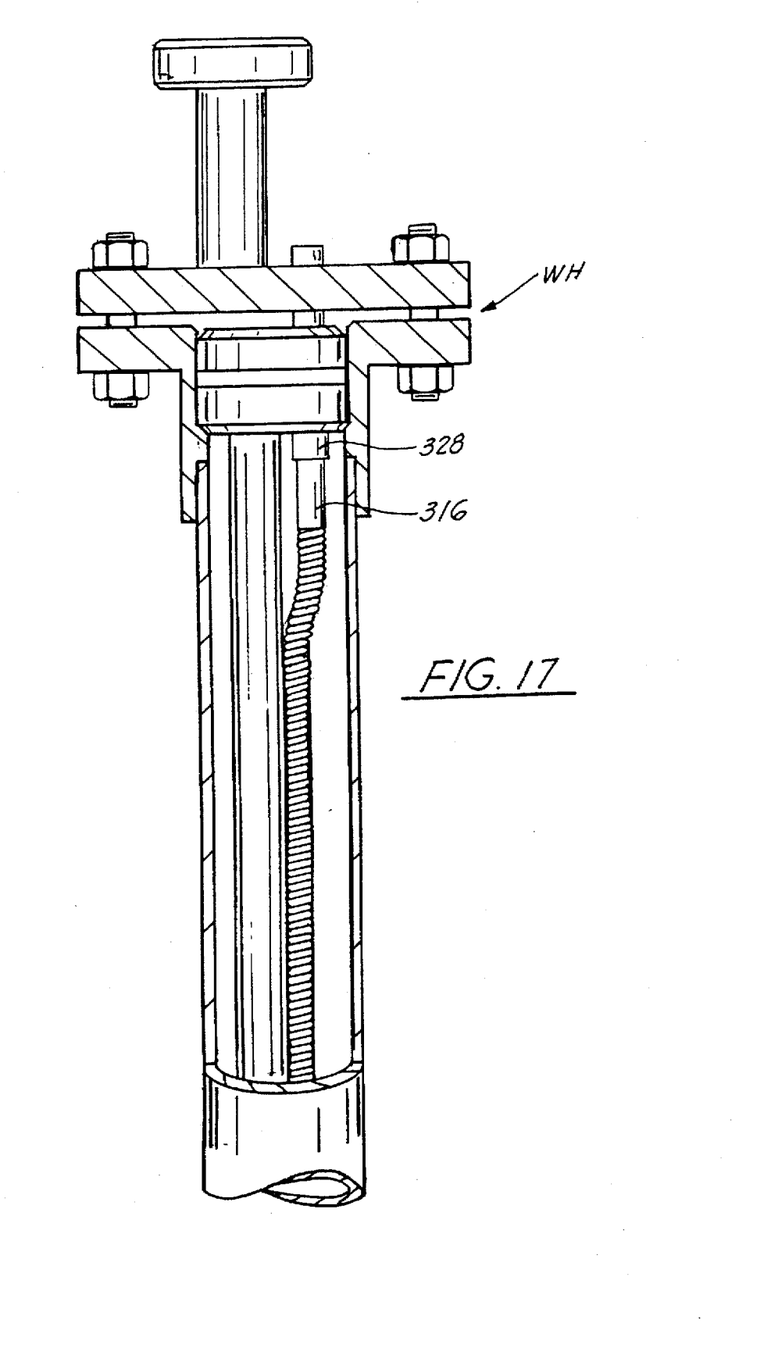
FIG. 17 is a front view, partially in section, which shows the invention used with another type of single penetrator tube.
Figure 18:
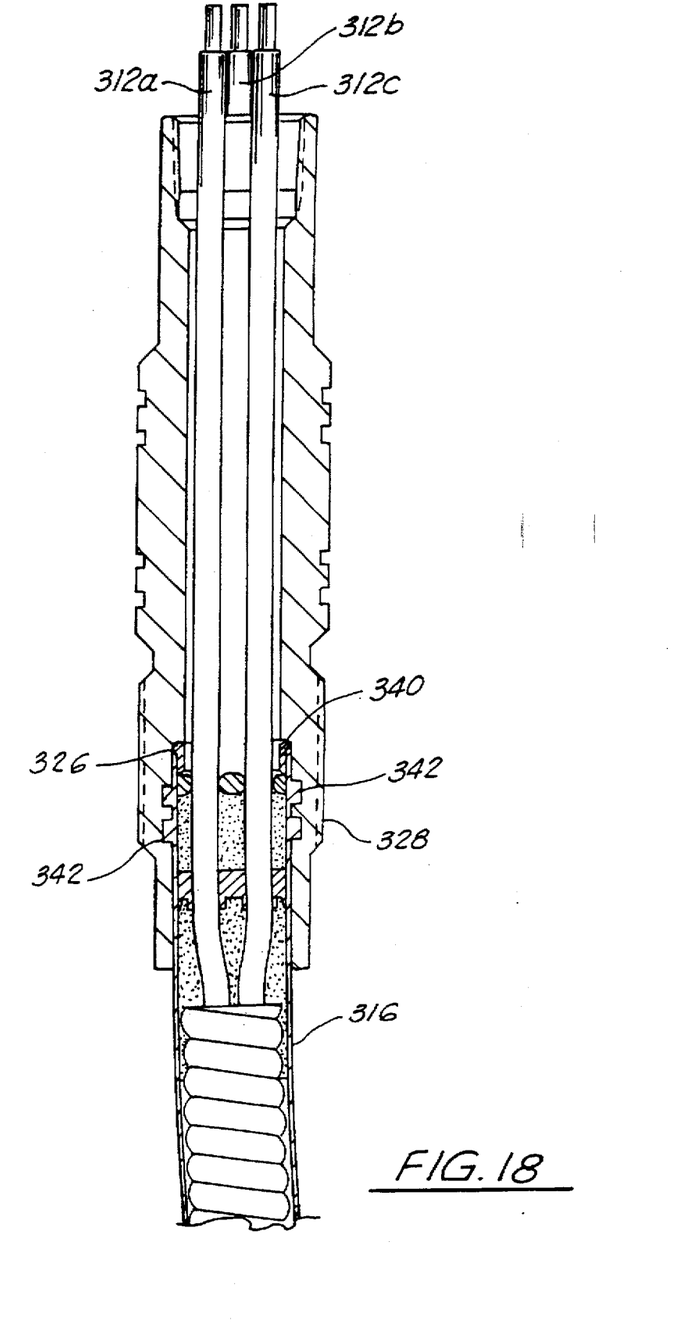
FIG. 18 is a sectional view of the penetrator of FIG. 17.

FIGS. 17 and 18 illustrate another application for the penetrator where the seal is formed in the same manner as described above. In this application, a rigid primary tube 316 is mounted to the lower end of a mandrel tube 328. A manifold cap 326 is secured to the primary tube 316 by soldering or the like and abuts an internal shoulder 340 formed in the mandrel tube 328. The conductors 312a, 312b and 312c extend through the mandrel tube 328, which extends through the wellhead WH in a known way. A pair of elastomeric O-rings 342 seal the space between the primary conduit 316 and the inner surface of the mandrel tube 328.

By providing a penetrator system of the type described above, the primary insulation for conductor cable connected to underground equipment is not interrupted until it is spliced to conductor cable connected to the power source outside of the wellhead. The splice is formed in an approved connection, which satisfies OSHA requirements for hazardous locations, and is approved by a nationally recognized testing laboratory such as Factory Mutual Research Corporation. The splice is formed in a manner that is listed and approved for classified hazardous locations which are adjacent to the wellhead.

The invention provides a transition which is much less expensive than ones previously used, which can easily be fabricated in the field when installing an electric submersible pump in a well. The transition can be formed on a conventional electrical pump cable of different sizes and types without the need for any special adaptations, in certain applications it avoids typical space requirements in the wellhead barrier where an electrical splice or other connection is formed in or below the wellhead barrier, it avoids breaking the insulation of the conductors which extend from the downhole equipment, and eliminates a number of parts. Also, a great deal of time is saved during installation in the field by eliminating the need for a downhole cable splice.

The foregoing disclosure and description are intended to be illustrative and explanatory of the invention, thereof, and various changes in the size, shape and materials, as well as the details of the illustrated operation and construction may be made without departing from the spirit and scope of the invention.

What is claimed:

1. A transition for insulated electrical well cable adapted for passage through a wellhead barrier of an underground well leading to an electrical power cable connected to an above-ground electrical power source, the transition comprising:
    a) a length of insulated electrical well cable extending uninterrupted from an underground well through the wellhead barrier;
    b) a connection between the insulated electrical well cable and the electrical power cable, the connection being formed outside the wellhead barrier within an area adjacent to the wellhead barrier classified as a hazardous location, the connection being listed and approved for hazardous locations by a nationally recognized testing laboratory;
    c) an elastomeric seal in the well around the insulated electrical well cable, the seal being confined for blocking the flow of fluid into or out of the well.

2. The transition of claim 1, wherein a portion of said electrical well cable in the well includes an outer protective cable coating and a plurality of insulated electrical conductors projecting from the protective cable coating.

3. The transition of claim 2, and further comprising a primary conduit with an inner surface defining an elongated opening, the primary conduit extending through at least a portion of the wellhead barrier, the primary conduit surrounding a portion of the electrical conductors and a portion of the protective cable coating.

4. The transition of claim 3, and further comprising:
    a) the elastomeric seal in the primary conduit for providing a seal between the electrical conductors and the inner surface of the conduit, the elastomeric seal having opposed faces;
    b) relatively hard backing material in the primary conduit abutting against both faces of the elastomeric seal and located around and between the conductors and the inner surface of the conduit.

5. The transition of claim 4, and further comprising the backing material surrounding at least part of the protective cable coating extending into the elongated opening of the primary conduit.

6. The transition of claim 4, wherein the relatively hard backing material comprises an epoxy putty with good dielectric properties that is resistant to fluids in the well, that is compressed before it hardens to surround the conductors and fill the spaces in the elongated opening of the primary conduit, whereas the flow of fluids out of the well is blocked when the well is pressurized and the seal and insulation on the conductors is prevented from expanding and rupturing when pressure is released from the well.

7. The transition of claim 4, wherein the elastomeric seal is formed of synthetic rubber.

8. The transition of claim 3, and further including an elongated rigid conduit extending between the primary conduit and an opening in the wellhead barrier for each of the conductors, a first fluid-tight connection between the elongated conduits and the primary conduit and a second fluid-tight connection between the elongated rigid conduits and the wellhead barrier openings.

9. The transition of claim 8, wherein the first fluid-tight connection comprises a manifold cap connected to the primary conduit, with openings in the manifold cap for receiving the elongated rigid conduits, and a back-up bushing between the relatively hard backing material and the manifold cap.

10. The transition of claim 3, wherein a fluid-tight passageway extends from the primary conduit to the connection outside the wellhead barrier to the electrical power cable.

11. The transition of claim 2, wherein the connection comprises an electrical splice connection.

12. A confined seal for blocking fluid flow in a transition for electrical well cable through a wellhead barrier of an underground well, wherein the electrical well cable has an outer protective coating and at least one insulated electrical conductor projecting from the protective coating, the seal comprising:
    a) a primary conduit having an inner surface defining an elongated opening for receiving the insulated electrical conductor and at least a portion of the outer protective cable coating;
    b) an elastomeric seal with opposing faces for providing a seal between the insulated electrical conductor and the inner surface of the primary conduit; and
    c) a relatively hard backing material abutting against the opposing faces of the elastomeric seal located around and between the conductor and the inner surface of the primary conduit for confining the elastomeric seal in the primary conduit.

13. The confined seal of claim 12, and further comprising the backing material surrounding at least part of the protective cable coating extending into the elongated opening of the primary conduit.

14. The confined seal of claim 12, wherein the relatively hard backing material comprises an epoxy putty with good dielectric properties that is resistant to fluids in the well, that is compressed before it hardens to surround the conductors and fill the spaces in the elongated opening of the primary conduit, where as the flow of fluids out of the well is blocked when the well is pressurized and the seal and insulation on the conductors is prevented from expanding and rupturing when pressure is released from the well.

15. The confined seal of claim 12, wherein the elastomeric seal is formed of a synthetic rubber.

16. The confined seal of claim 12, wherein the electrical well cable includes a plurality of insulated electrical conductors projecting from the protective coating.

17. A method of forming a confined elastomeric seal for a transition for electrical well cable in a wellhead barrier of an underground well, comprising the steps of:

a) exposing at least one insulated electrical conductor by removing the outer protective coating from a portion of electrical well cable that extends uninterrupted from downhole electrical equipment;

b) positioning a relatively hard backing material and an elastomeric seal with opposing faces around the insulated conductor cable, the relatively hard backing material abutting both opposing faces of the elastomeric seal, and extending along the insulated electrical conductor on both sides of the seal;

c) surrounding the seal and relatively hard backing material along the length of the insulated electrical conductor with a primary conduit for isolating the insulated electrical conductor from the well and forming a seal around the conductor; and d) confining the seal between the hardened backing material to prevent well fluids from flowing both into and out of the well between the insulated electrical conductor and primary conduit.

18. The method of claim 17, wherein step (a) comprises trimming the outer protective coating and an inner insulating layer away from a plurality of insulated conductor cables.

19. The method of claim 17, wherein step (b) includes the steps of packing a first portion of epoxy putty in its resilient state around a first length of the insulated electrical conductor, the elastomeric seal having one face being in abutting relationship against the first portion of epoxy putty, and packing a second portion of epoxy putty around a second length of insulated electrical conductor in abutting relationship to the opposing face of the elastomeric seal.

20. The method of claim 17, wherein step (c) includes providing an elastomeric seal with an outer diameter larger than the opening in the primary conduit and an opening for receiving the insulated electrical conductor that is smaller than the insulated electrical conductor for providing a tight seal between adjacent surfaces.

21. The method of claim 19, and further including the step of packing the first portion of epoxy putty in its formable state around a portion of the outer protective coating of the electrical well cable.

22. The method of claim 21, wherein step (d) includes compressing the epoxy putty before it hardens to fill all the spaces in the primary conduit and around the elastomeric seal, insulated electrical conductor and electrical well cable.

23. The method of claim 21, wherein the step of compressing includes the steps of (a) connecting a compressing tool between the primary conduit and the electrical well cable, the primary conduit including a compression member abutting against the second portion of epoxy putty, and the first portion of epoxy putty being located in a confined space, and (b) using the compressing tool to move the primary conduit toward the electrical well cable to extrude the epoxy putty before it hardens into all spaces around the elastomeric seal and insulated electrical conductor.

* * * * *